Sept. 7, 1948. J. R. WILKERSON 2,448,564
MOTOR CONTROL CIRCUITS
Filed July 24, 1942 4 Sheets-Sheet 1
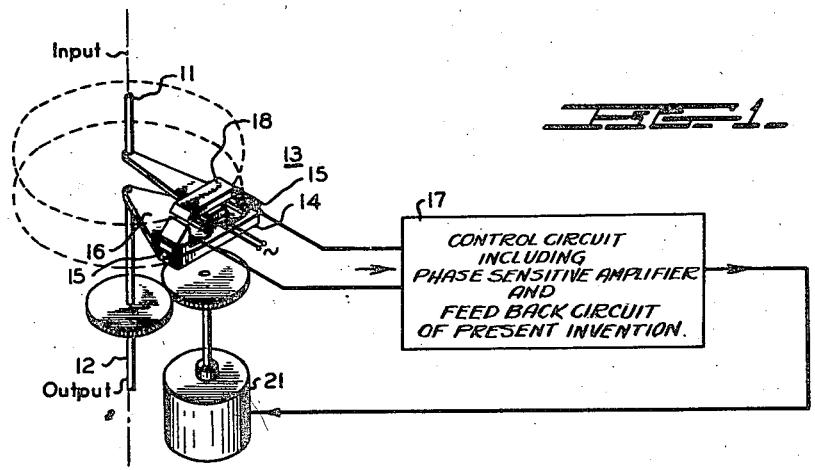
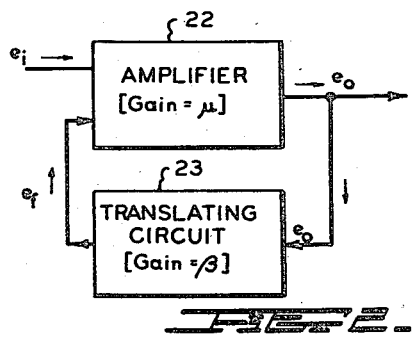
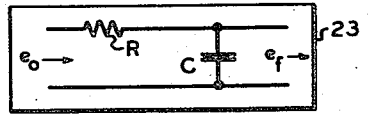
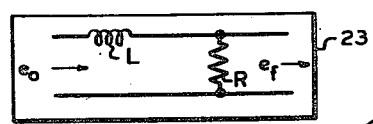
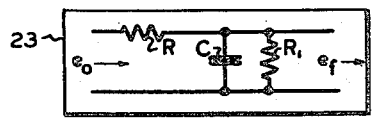
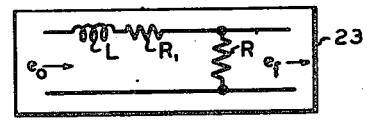
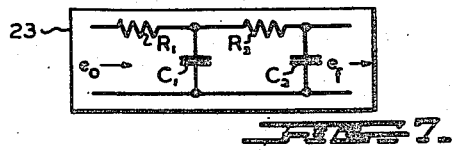
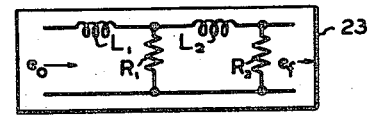
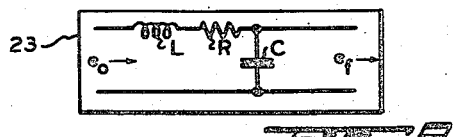
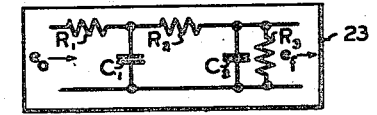
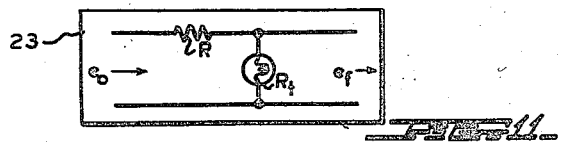
INVENTOR
JEFFERSON R. WILKERSON;
BY
HIS ATTORNEY Sept. 7, 1948.  J. R. WILKERSON  2,448,564
MOTOR CONTROL CIRCUITS
Filed July 24, 1942  4 Sheets-Sheet 2
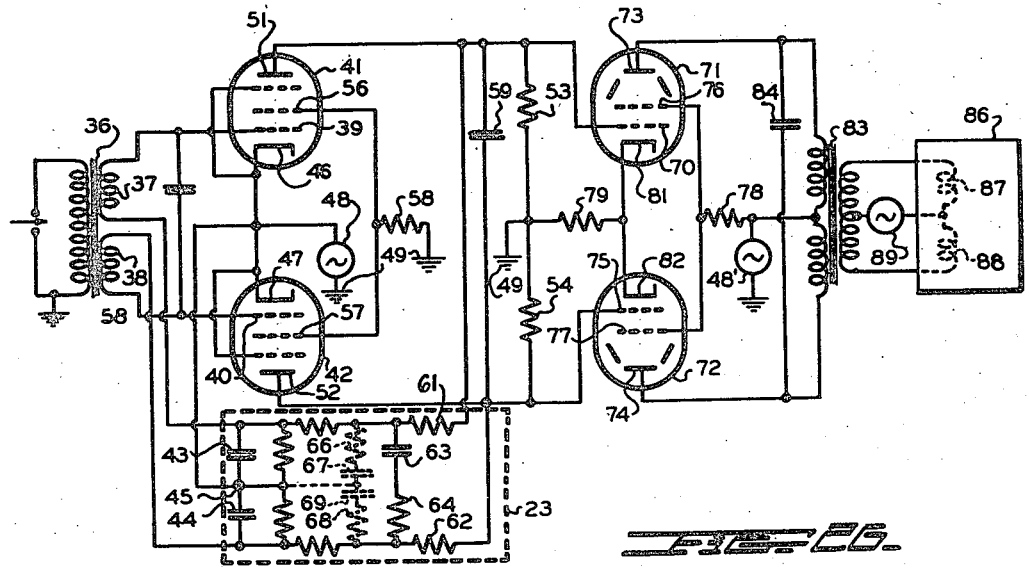
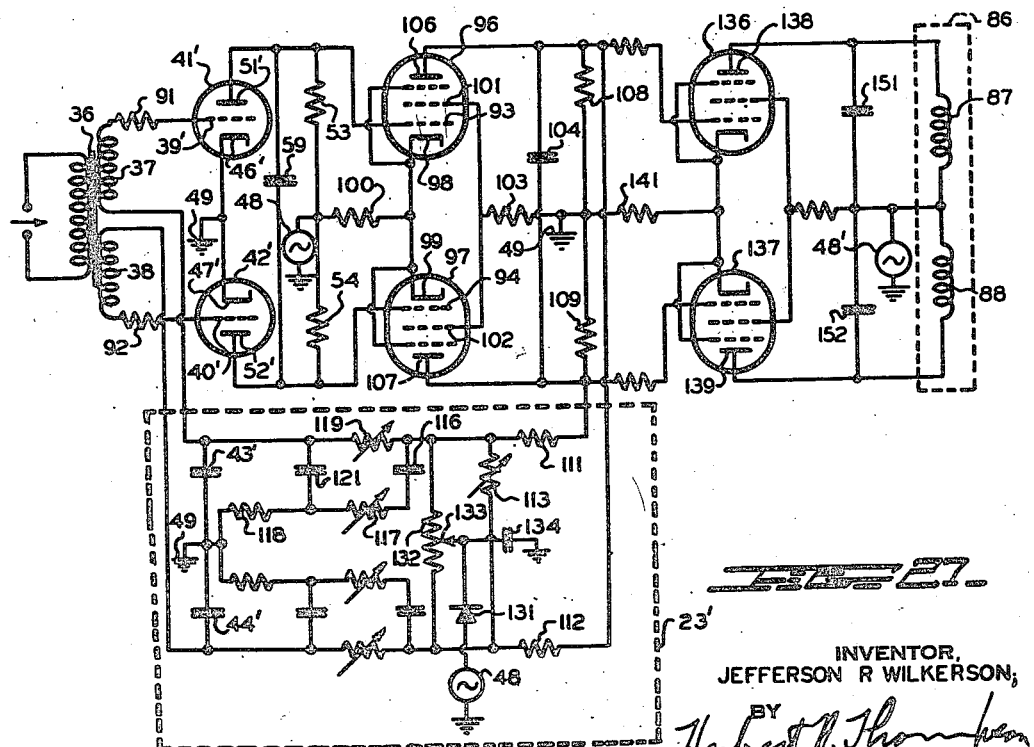
INVENTOR,
JEFFERSON R WILKERSON,
BY
Herbert N. Thompson
HIS ATTORNEY Sept. 7, 1948.  J. R. WILKERSON  2,448,564
MOTOR CONTROL CIRCUITS Filed July 24, 1942  4 Sheets-Sheet 3

INVENTOR
JEFFERSON R. WILKERSON;
BY
HIS ATTORNEY

Sept. 7, 1948. J. R. WILKERSON 2,448,564
MOTOR CONTROL CIRCUITS
Filed July 24, 1942 4 Sheets-Sheet 4
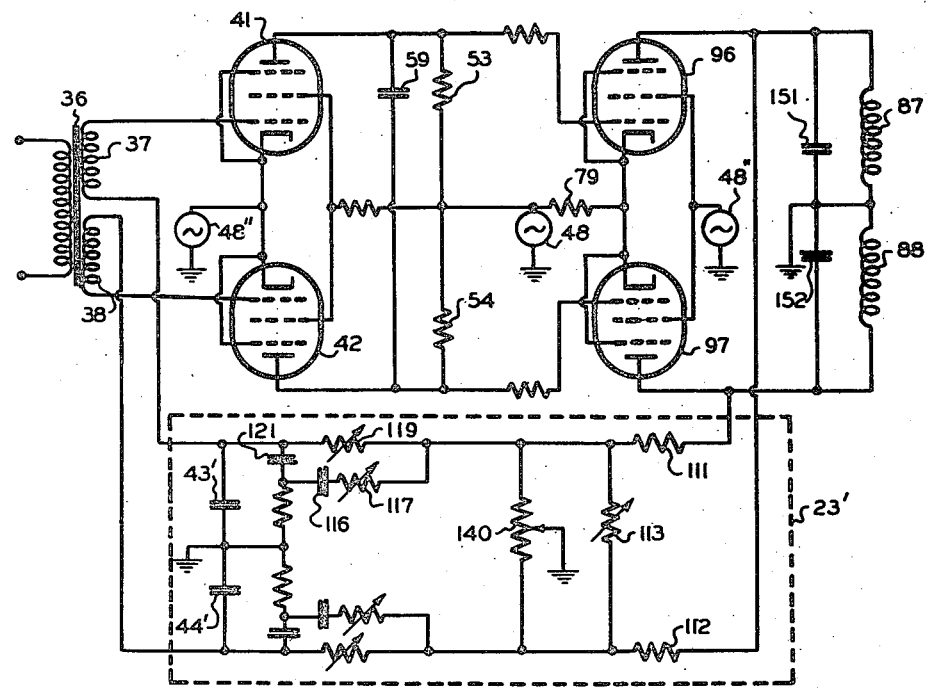
INVENTOR
JEFFERSON R. WILKERSON;
BY
HIS ATTORNEY Patented Sept. 7, 1948

2,448,564

UNITED STATES PATENT OFFICE 2,448,564

MOTOR CONTROL CIRCUITS

Jefferson R. Wilkerson, Bayside, N. Y., assignor to The Sperry Corporation, a corporation of Delaware Application July 24, 1942, Serial No. 452,239

30 Claims. (Cl. 318—31)

The present system is concerned with the art including apparatus for modifying control signals to produce time integrals or derivatives thereof, as in the control of ponderable objects and, more especially, the non-lagging, non-hunting control of such ponderable objects.

In control systems of the present type, such as follow-up systems or servo systems controlling heavy objects, or automatic pilots for aircraft or ships, wherein a large ponderable object is to be controlled from a control signal of relatively small magnitude and low power, it is well known to amplify these control signals in power and/or magnitude to provide a sufficient controlling effect to actuate a servo mechanism to control the ponderable object, as desired. In order to avoid hunting and lagging effects, it is also known to modify the control signal by the addition of components corresponding to the rate of change and also to higher time derivatives of the control signal. Such systems, however, are subject to the disadvantage that any variation in the amplifying apparatus, such as is necessarily caused by fluctuations in power supply voltage, variations in vacuum tube characteristics due to aging or hard usage, etc., have a corresponding and definite effect upon the output of the control circuit actuating the servo mechanism.

According to the present invention, improved control signal amplifying and rate deriving circuits are provided, suitable for use in such ponderable object control systems, whereby the harmful effects of variation in the control signal amplification and rate signal generation are greatly minimized and substantially eliminated.

In the present invention this may be performed by the use of a feed-back amplifier in which the output signal is degeneratively fed back to the input after modification in such manner as to produce the required combination of control signal and its time derivatives in the output circuit. As will be seen, this is most easily done by the incorporation of suitable integrating circuits in the negative feed-back path.

Accordingly, it is an object of the present invention to provide improved apparatus for controlling a ponderable object in response to a relatively weak control signal.

It is another object of the present invention to provide improved rate deriving and control circuits for use in controlling ponderable objects, substantially independent of the amplification produced in these control circuits.

It is still another object of the present invention to provide improved integral and rate deriving circuits in which the effects of non-linearity or fluctuations in the amplification of thermionic amplifiers associated therewith are greatly minimized and substantially eliminated.

It is a further object of the present invention to provide an improved derivative or integral deriving circuit by the use of negative feed-back amplifiers.

It is still another object of the present invention to provide improved rate deriving circuits and amplifying means including an integrating network in a negative feed-back path for said amplifier, whereby variations in the amplification of said amplifier due, for example, to tube variations or power supply variations, are rendered ineffective in the output thereof.

Other objects and advantages will become apparent from the specification, taken in connection with the accompanying drawings in which, Fig. 1 is a schematic representation of an exemplary system embodying the present invention.

Fig. 2 shows a schematic block diagram of the improved circuit of the present invention.

Figs. 3 to 13 show various types of translating circuit which may be used with the system of Fig. 2 to provide time derivative outputs.

Figs. 26 to 28 show specific detailed embodiments of several forms of rate amplifiers of the form of Fig. 2.

Figure 12:
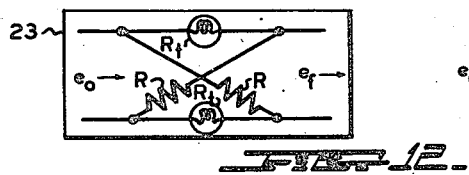

In Fig. 1 there is shown a schematic diagram of a control system for a ponderable object, shown for illustration purposes as a conventional type of follow-up system, comprising a sensitive controlling element, such as a control shaft 11, whose low-power angular displacement it is desired to reproduce as a corresponding and preferably equal angular displacement of an output shaft 12 which actuates a ponderable object (not shown). For this purpose, a pick-off 13 is provided adapted to produce a signal indicative of the relative displacement between control shaft 11 and output shaft 12.

In the present instance, this pick-off is shown as of the conventional three-legged magnetic type comprising a three-legged core 14 carried on an arm 16 fixed to the output shaft 12. The center leg of core 14 carries an energizing winding energized from any suitable source of alternating current. The outermost legs of core 14 also carry windings 15 which are connected in series opposition to the input of a phase-sensitive amplifier 17.

Core 14 cooperates with a magnetic armature 18 actuated by control shaft 11. In the well known manner, core 14, armature 18, and the windings of core 14 are adjusted to provide a zero signal-voltage output from coils 15 for a predetermined relative position of the core 14 and armature 18, and to provide a reversible-phase variable-magnitude alternating signal-voltage output upon departure from this predetermined relative position, corresponding in phase-sense and magnitude to the sense and magnitude of the relative displacement between the control shaft 11 and the output shaft 12. Such pick-offs are well known in the art and need not be further described here.

The output of pick-off 13 is fed to a control circuit 17 including a phase-sensitive amplifier, which may be of any conventional type, adapted to produce in its output a reversible-polarity direct-current signal corresponding in magnitude and polarity to the magnitude and phase-sense of the pick-off signal, and, accordingly, to the magnitude and sense of relative-displacement between the control shaft 11 and output shaft 12.

It will be clear from what follows that the present system need not be restricted to this type of control-signal-producing means but that any type of pick-off, adapted to produce a control signal, either alternating or unidirectional, representing the sense and magnitude of the relative displacement between control shaft 11 and the output shaft 12, may be used. In addition, the present invention is not restricted only to follow-up systems, but also includes systems where a ponderable object is controlled by a weak signal corresponding to deviation of the object from a desired condition. One such system is an automatic pilot for aircraft or ships where the steering of the craft is controlled from a weak signal derived from a compass, gyro or other orientation-maintaining instrument. In the aircraft pilot, the attitude of the craft in pitch and roll may be thus controlled by the signal derived from a gyro-vertical or other vertical-maintaining instrument. Other types of systems include remote control or servo mechanisms, where the position or speed of a ponderable object is controlled in correspondence with a remotely produced low power signal. Many other uses of the present system are also possible, as will be seen, wherever the character of a control signal has to be modified by the addition of components corresponding to time derivatives or time integrals of the time variation of the control signal.

The output of phase-sensitive amplifier 17 is generally fed in prior art systems to a rate circuit which includes suitable well-known circuits for adding to the control signal various components representing first and/or higher time derivatives thereof, and for amplifying such signals. The output of the rate circuit then serves to actuate a servo device 21, which may be of any type, adapted to produce an output motion corresponding to the control signal input thereto. Generally speaking, servo 21 will be a device capable of substantial power output in order to suitably control whatever ponderable object may be connected to output shaft 12.

The output of servo 21 is suitably coupled to output shaft 12 and is connected thereto in such sense as to restore output shaft 12 to correspondence with control shaft 11 and thereby diminish the control signal derived from pick-off 13, which, in the case of a follow-up system such as here shown, may be termed an "error" or "displacement" signal. By suitably proportioning the components of the signal voltage controlling the servo 21, which components usually represent the relative displacement between control shaft 11 and output shaft 12, the rate of change of this displacement and the second derivative of this displacement (which may be considered to be the relative acceleration of the two shafts in the present illustration) as well as any desired higher derivatives, it is possible to cause output shaft 12 to follow the angular motion of control shaft 11 substantially without hunting or oscillating and without lag. The first time derivative of the control signal will be hereinafter termed a "rate signal."

Such systems as that shown in Fig. 1 are well known in the art, as exemplified by the following Hull Patent Nos. 2,068,490, 2,088,654, and 2,233,415 for positional control systems. However, in all of the prior art devices using such rate circuits, the output voltage of the rate circuit is greatly decreased in magnitude in comparison to the input voltage representing the control signal. Therefore, it is necessary to provide a large amount of additional amplification for the combined derivative and control signals in such prior art devices. Such amplifiers, however, are subject to well known defects and variations in their amplification properties, due primarily to non-linearity of their amplification characteristics and variations in gain, such as due to fluctuations in power supply voltage, and to variations in tube characteristics because of age, usage, etc. These variations in amplification cause wide variations in the output of the rate circuit, and have a correspondingly harmful effect upon the desired operation of the servomotor controlled thereby.

These defects of the prior art device may be substantially overcome by the present invention. Referring now to Fig. 2, there is shown a schematic diagram of the improved rate circuit of the present invention, which may be embodied in the control circuit of Fig. 1. This circuit comprises an amplifying device 22 whose output voltage having instantaneous value $e_o$ is fed through a translating circuit 23 to be later described to produce an instantaneous feedback voltage $e_f$ which is added to the instantaneous control voltage $e_i$ input to the amplifier 22.

Let it be assumed that the instantaneous ratio of output voltage $e_o$ to input control voltage $e_i$ with zero feedback voltage $e_f$ is equal to $\mu$, and that the ratio of the instantaneous value of feedback voltage $e_f$ to the voltage input of translating circuit 23, namely, $e_o$, is given by $\beta$, which may be termed the instantaneous gain of the feedback circuit 23. Accordingly, the operation of amplifier 22 may be described by the equation $$e_o = \mu(e_i + e_f) \tag{1}$$

which may be rewritten as $$e_o = \frac{\mu e_i}{1 - \mu\beta} = A e_i \tag{2}$$

by using the relationship between $e_f$ and $e_o$, where A is the overall instantaneous gain of the improved rate circuit; that is, A is the instantaneous ratio of output to input voltages of the entire system.

If now the characteristics of amplifier 22 and translating circuit 23 are so chosen that $\mu\beta$ is very much larger than unity, the quantity 1 in the denominator of the preceding equation will be negligible in comparison to the quantity $\mu\beta$, and the preceding Equation 2 may be rewritten as $$e_o = \frac{e_i}{-\beta} \qquad (3)$$

If we substitute for $e_o$ its value $$\frac{e_f}{\beta}$$

it will be seen that $$e_i \doteq -e_f \qquad (4)$$

In other words, for the assumed condition to hold, it is necessary that the feedback voltage be instantaneously of substantially the same magnitude as the control signal $e_i$. This may be accomplished by a suitable design of the translating circuit 23, whose characteristics have not yet been described.

If we assume that the feedback voltage $e_f$ derived from the output voltage $e_o$ by action of the translating circuit 23 has a voltage wave form which is an arbitrary function F of the output voltage $e_o$ we may write $$e_f = F(e_o) \qquad (5)$$

From Equation 4 this becomes $$e_i \doteq -F(e_o) \qquad (6)$$

or $$e_o \doteq F^{-1}(e_i) \qquad (7)$$

where the latter equation merely means that $e_i$ will bear the same functional relation to $e_o$ as $e_f$ does to $e_o$. Stated differently, $e_o$ is related to $e_i$ by a functional relation which is the inverse of that by which $e_f$ is related to $e_o$, so that $e_i$ will be the same function of $e_o$ as $e_f$ is of $e_o$.

Accordingly, the above analysis shows clearly that the use of a translating circuit in the negative feedback path of an amplifier having high amplification ($\mu$) with respect to the attenuation $$\left(\frac{1}{\beta}\right)$$

of the translating circuit will produce an output from the system having a wave shape which is the inverse function of the wave shape produced by the translating circuit from the voltage input to this translating circuit. For example, if it is desired to produce an output voltage $e_o$ from the system which is proportional to the time derivative or rate of change of the input voltage $e_i$, then by the above analysis the translating circuit 23 should produce a feedback voltage $e_f$ which is the "inverse derivative" or actually the integral of the voltage $e_o$ input to the translating circuit 23. This may easily be shown in the following way:

Assume that $$e_o = \frac{de_i}{dt} \qquad (8)$$

as is desired. But from (4), $$e_i \doteq e_f \qquad (9)$$

since the minus sign may effectively be disregarded as it merely connotes a reversal of polarity as by an interchange of terminals. Accordingly, $$e_o = \frac{de_f}{dt} \qquad (10)$$

or integrating both sides of this last equation, $$e_f = \int e_o dt \qquad (11)$$

which shows that the translating circuit 23 must operate upon its input voltage $e_o$ to produce an output voltage $e_f$ which is the integral of $e_o$ with respect to time. Such integrating circuits are well-known in the art, and therefore may be used directly as the translating circuit 23 to produce a signal output $e_o$ which is the rate of change of the input signal $e_i$.

Figs. 3–21 show various types of translating circuit 23 for use with the system of Fig. 2. It is to be understood in all of these circuits that $\mu\beta \gg 1$, so that Equation 4 is valid.

Thus, Fig. 3 shows a series circuit comprising a resistor R and condenser C, the feedback voltage $e_f$ being derived from the volt drop across condenser C. If $i$ is the current flowing through R and C, then $$e_o = Ri + \frac{1}{C}\int i\, dt \qquad (12)$$

and $$e_f = \frac{1}{C}\int i\, dt \qquad (13)$$

from which $$i = C\frac{de_f}{dt} = -C\frac{de_i}{dt} \qquad (14)$$

by (4). Substituting from (14) into (12), $$-e_o = RC\frac{de_i}{dt} + e_i \qquad (15)$$

so that the output voltage represents a combination of the control signal $e_i$ and its rate of change $$\frac{de_i}{dt}$$

If RC is much greater than unity (large time constant), the control signal component becomes negligible, and Equation 15 then shows that only a rate signal is produced. With this latter assumption, it will be recognized that the circuit of Fig. 3 represents the well-known integrating circuit, which, as discussed above, produces an output rate signal when connected in the negative feed-back path.

Fig. 4 shows another translating circuit similar in effect to Fig. 3, but comprising a coil having inductance L in series with a resistance R, the feedback voltage $e_f$ being derived from the volt-drop across resistor R. Here it may be shown that $$-e_o = \frac{L}{R}\frac{de_i}{dt} + e_i \qquad (16)$$

again yielding a combination of control signal $e_i$ and its rate $$\frac{de_i}{dt}$$

in the output $e_o$. Here also, if time constant $$\frac{L}{R}$$

is much greater than unity, an integrating circuit is produced, and the output voltage $e_o$ becomes proportional to substantially a pure derivative of the input voltage $e_i$.

Fig. 5 shows a further embodiment of translating circuit 23, similar to that shown in Fig. 3, but further including a resistor $R_1$ connected in parallel with the condenser C. Upon analysis, it may be shown that by the use of this translating circuit the relationship between the output voltage $e_o$ and the input $e_i$ is as follows:

$$-e_o = \frac{R + R_1}{R_1}e_i + RC\frac{de_i}{dt} \qquad (17)$$

It will be seen from this equation that the output voltage again is a combination of components corresponding to the input voltage and its rate of change, or time derivative. Furthermore, by adjusting the value of resistor $R_1$, the relative magnitudes of the control signal and rate components appearing in the output $e_o$ may be adjusted relative to one another. Thus, as the resistance value of $R_1$ is decreased, the amplitude of the control signal component relative to the rate signal component will be increased, and as $R_1$ is increased to a value very large compared to $R$, it will be seen that Equation 17 approaches Equation 15, as was to be expected.

Fig. 6 shows still another embodiment of the translating circuit 23 similar to that shown in Fig. 4, but including a resistor $R_1$ in series with the inductance L. The output voltage from this circuit may be expressed by the equation $$-e_o + \frac{L}{R}\frac{de_i}{dt} + \left(\frac{R+R_1}{R}\right)e_i \quad (18)$$

and it will be seen that this equation is similar to the preceding Equation 17. However, the smaller the value of $R_1$, the lower the magnitude of the control signal component will be, whereas the larger the value of $R_1$ compared to $R$, the greater will be the relative magnitude of the control signal component compared to the rate signal component.

Accordingly, in Figs. 5 and 6, by making resistor $R_1$ adjustable, there is provided a simple and effective means for adjusting the amplitude of the control signal component with respect to that of the rate signal in the output, in accordance with the requirements of the particular control system.

The circuits of Figs. 3 through 6 are adapted to produce either a time derivative signal only or a combination of the control signal and rate signal. If it is additionally desired to produce a second derivative component, which might be called an "acceleration signal," recourse may be had to the circuit of Fig. 7, which essentially comprises the cascaded connection of two circuits of the type shown in Fig. 3. Thus, in the translating circuit of Fig. 7, a resistor $R_1$ is connected in series with a condenser $C_1$. Across condenser $C_1$ is connected a further series circuit comprising resistor $R_2$ and condenser $C_2$, and the feedback voltage $e_f$ is derived from the voltage across condenser $C_2$. The output voltage from the rate circuit of Fig. 2, using the translating circuit of Fig. 7, will then have the form $$-e_o = (R_1C_1 + R_2C_2)\frac{de_i}{dt} + R_1C_1R_2C_2\frac{d^2e_i}{dt^2} \quad (19)$$

Various conditions may be obtained from this circuit. Thus, if the time constants $R_1C_1$ and $R_2C_2$ are both large compared to unity, then their product must be much larger than their sum, and accordingly the first term of the right-hand member of Equation 19 becomes negligible with respect to the second term, and the system provides a pure second derivative or acceleration signal output. If one or the other of these time constants $R_1C_1$ or $R_2C_2$ is large compared to the other, then the Equation 19 degenerates into equation $$-e_o = RC\frac{de_i}{dt} + R_1C_1R_2C_2\frac{d^2e_i}{dt^2} \quad (20)$$

where RC is the larger time constant, from which it will be seen that the amplitude of the rate signal component depends solely upon that one of the time constants which is large, since in the first term of the right-hand member of Equation 19, the smaller time constant becomes negligible compared to the larger time constant. This, then, provides a method of adjusting the relative magnitudes of the rate signal component and acceleration signal component, which may be most simply done in practice by adjusting the value of resistance $R_1$ or $R_2$.

Fig. 8 shows the application of the modification of Fig. 7 to that of Fig. 4, by cascading two rate circuits of the type of Fig. 4. Fig. 8 comprises series-connected inductance $L_1$ and resistance $R_1$ and a second series circuit $L_2$, $R_2$ connected across resistor $R_1$, the output voltage $e_f$ being derived from the volt drop across resistor $R_2$. The output voltage from the rate circuit of Fig. 2, employing the translating circuit of Fig. 8, will then be as shown in the equation $$e_o = \left(\frac{L_1}{R_1} + \frac{L_2}{R_2}\right)\frac{de_i}{dt} + \frac{L_1L_2}{R_1R_2}\frac{d^2e_i}{dt^2} \quad (21)$$

which is similar in form to that of Equation 19, and the same considerations discussed with respect to Equation 19 apply equally well to this Equation 21, merely substituting the time constants $$\frac{L_1}{R_1} \quad \text{and} \quad \frac{L_2}{R_2}$$

in place of the corresponding time constants $R_1C_1$ and $R_2C_2$ of the preceding equation.

It is to be noted that in the circuits of Figs. 7 and 8, the output comprises only rate signal and acceleration signal components, no control signal components appearing therein. To also obtain a component proportional to the control signal in the output, recourse may be had to the circuit of Fig. 9, comprising an inductance L in series with a resistance R and capacitance C, the output voltage being derived from the voltdrop across condenser C. This output voltage may be expressed by the equation $$e_o = LC\frac{d^2e_i}{dt^2} + RC\frac{de_i}{dt} + e_i \quad (22)$$

Accordingly, it will be seen that the magnitude of the rate component depends mainly upon the value of resistor R, the value of the acceleration signal component depends mainly on the inductance L, and the magnitude of the control signal component relative to the other two components depends upon the value of capacitance C. By making any or all of these factors adjustable, it is possible to obtain any desired relative proportions of control signal, rate signal and acceleration signal components.

As a second method of obtaining all three signal components, the translating circuit of Fig. 10 may be used. This circuit is similar to the circuit of Fig. 7, further including a resistor $R_3$ connected in parallel with the capacitance $C_2$. It may be considered to be formed by cascading the circuits of Figs. 3 and 5. The effect of this resistance $R_3$ is to introduce a component in the output proportional to the control signal $e_i$ in a fashion similar to that discussed with respect to Fig. 5. The expression for the output voltage for the rate circuit of Fig. 2 using this translating circuit will then be as shown in the equation $$-e_o = R_1C_1R_2C_2\frac{d^2e_i}{dt^2} + \left(R_2C_2 + \frac{R_2+R_3}{R}R_1C_1\right)\frac{de_i}{dt} + \frac{R_2+R_3}{R_3}e_i \quad (23)$$

and here, also, the relative amplitudes of the control, rate and acceleration signal components may be adjusted, by adjustment of the various resistors $R_1$, $R_2$ and $R_3$.

In a similar manner the circuits of Figs. 4 and 6 may be cascaded to also provide a combination of control, rate and acceleration signal components, relatively adjustable by simple resistance adjustments.

Also, any of the other circuits yielding rate signal components may be cascaded with similar or different circuits also producing rates, for producing second and/or higher derivative signal components in the output $e_o$.

Fig. 11 shows a further modification of translating circuit 23 which is adapted to produce an output signal $e_o$ similar in effect to a combined control and derivative signal, although not rigorously analytically representable as such a signal. This circuit comprises a fixed fairly high resistor R connected across the input voltage $e_i$ in series with a variable resistor $R_t$, whose resistance varies with its temperature and/or the current passing therethrough. The feedback voltage $e_f$ for the circuit of Fig. 2 is here derived from the volt-drop across thermal resistor $R_t$. Suitable types of such a thermal resistor $R_t$ are ordinary tungsten filament lamps or well-known products known by the names of "thermistors" or "varistors." All of these thermal resistors have the property of low resistance when cold or with low values of current, and high resistance for higher temperatures or higher values of current.

Considering the condition when zero input voltage $e_i$ is impressed upon the circuit, it will be clear that no output voltage $e_o$ and hence no feedback voltage $e_f$ will be obtained. If an input voltage $e_i$ is suddenly impressed upon the circuit, this voltage will be amplified to produce voltage $e_o$, which will be impressed across the translating circuit of Fig. 11. At the first instant that this voltage $e_o$ is impressed on the translating circuit, the thermal resistor $R_t$, having a low resistance compared to resistor R, will provide a very small feed-back voltage $e_f$ which does not seriously decrease the net input voltage ($e_i - e_f$) to amplifier 22, so that the output voltage $e_o$ is maintained at a high value. However, as this voltage $e_o$ persists, the current passing through thermal resistor $R_t$ serves to increase its resistance and thereby increase the feedback voltage $e_f$. This decreases the net voltage input to amplifier 22, reducing the output voltage $e_o$ accordingly, until an equilibrium condition is reached, at which time the output voltage $e_o$ will be materially less than its initial value.

Accordingly, in this way, a high initial output signal strength is obtained, gradually decreasing to a lower level. This corresponds roughly to a combination of control signal, rate signal and acceleration signal components in the output, since the resulting equilibrium signal may be considered as the control signal component, and the high transient pulse initially obtained may be considered to represent a combination of the rate of change and second and/or higher derivatives of the input control signal. Thus this circuit yields at least roughly an output which may be desirably used to control a ponderable object without hunting or lag, as in Fig. 1, or for other purposes.

Fig. 12 shows a modification of the device of Fig. 11 in which a bridge circuit or four-terminal network is provided, one pair of opposite arms of which is formed by constant resistor R and the remaining opposite arms formed by thermal resistors $R_t$ of the type discussed above. This circuit is adjusted to be substantially balanced for a very low value of input voltage $e_o$ thereto; that is, for the cold resistance values of $R_t$. It is to be noted that although opposite arms of the bridge are indicated as having the same resistance values, this is not at all necessary so long as the desired balanced condition may be obtained.

Accordingly, as voltage $e_o$ varies from a small value to a large value, the output voltage $e_f$ of this circuit will vary correspondingly, but with a time delay introduced by the thermal properties of the thermal resistors $R_t$. The effect, therefore, will be the same as with the circuit of Fig. 11.

It is to be noted that, in each of the modifications of Figs. 3 through 12 thus far described, an actual or effective derivative of the control signal wave has been produced. However, such circuits require the transformation of the original variable-amplitude alternating-current signal into a corresponding variable-amplitude direct-current signal; that is, some type of phase sensitive amplifier or other detector is required, as indicated at 17 in Fig. 1.

In many applications, it is desirable to use variable-amplitude alternating current control signals of this type, and for purposes of economy, it would be desirable to eliminate apparatus for converting such a signal to direct-current. The circuits of Fig. 11 and Fig. 12 supply the required apparatus which eliminates the necessity for the use of phase sensitive amplifier 17. Thus, let it be supposed that the input control signal is an alternating current signal of frequency $f$ having its amplitude modulated in accordance with the control signal $e_i$ discussed with respect to Figs. 3 to 9. Accordingly, this input signal may be expressed as $e_i \sin 2\pi ft$. If such a signal is suddenly impressed upon the rate circuit of Fig. 2, using the translating circuit of Fig. 11, the effect will be the same as already described with respect to Fig. 11, since the thermal lag of the thermal resistor $R_t$ will prevent its following the rapid fluctuations in the instantaneous value of the input voltage at the frequency $f$, so that the system will respond effectively only to the changes in the modulation envelope $e_i$ of the input signal. Accordingly the output signal derived will be of the form $e_o \sin 2\pi ft$, where $e_o$ now represents the combination of control and derivative components of the input signal modulation envelope $e_i$, as is desired.

The circuit of Fig. 12 will also serve to provide an output from the circuit of Fig. 2 of the same frequency $f$ but having a modulation envelope which is a combination of the modulation envelope $e_i$ of the input signal $e_i \times \sin 2\pi ft$ and its derivatives.

Figure 13:
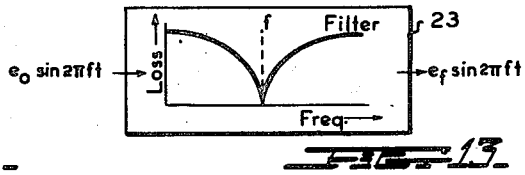

Fig. 13 shows a further form of translating circuit useful with Fig. 2, in which the necessity for the phase sensitive amplifier 17 is also eliminated. As indicated schematically in Fig. 13, this translating circuit consists of a suitable single-frequency pass-filter circuit passing frequency $f$, whose loss vs. frequency characteristic in the neighborhood of the pass frequency $f$ is substantially linear, as indicated in Fig. 13. If such a translating circuit is included to the feedback path of the rate circuit of Fig. 2, a large amount of feedback will be obtained for the components of the input signal $e_o \sin 2\pi f$ having frequency $f$, so that if a steady signal of frequency $f$ is applied to the input of the rate circuit substantially zero output will be obtained.

If this input signal is varying in any manner, however, such variations may be considered as producing sidebands upon the original frequency $f$, in a manner similar to suppressed carrier amplitude modulation, which sidebands will be transmitted through the translation circuit 23 of Fig. 13 in inverse relation to their frequency departure from the frequency $f$. Thus, a sharp change in the magnitude $e_i$ of the input signal $e_i \times \sin 2\pi ft$ will effectively produce sidebands having wide separation from the "carrier" frequency $f$, which will thereby be only weakly transmitted through the filter circuit of Fig. 13 to produce relatively low feedback $e_f$ and corresponding high output $e_o$, as is to be desired.

In this manner the circuit operates to produce an alternating rate signal output from an alternating input signal; that is the present circuit serves to differentiate the modulation envelope of the input signal and to produce an output which consists of the same carrier modulated by this derivative.

All of the above circuits have been concerned with producing time derivatives of various orders from the input signal, which are also useful in many applications not herein described. It may also be desirable to produce various integrals of the input signal, such as to correct for persisting errors, and for other uses. As discussed above, the feedback circuit or translating circuit 23 should be of a character inverse with respect to the over-all desired characteristic. Therefore to produce an over-all integration, it would appear necessary to provide differentiating circuits for the translating circuit 23.

Such is actually the case, and such feedback or translating circuits for producing over-all integrating effects are shown in Figs. 14 to 22. These circuits are essentially the inverse circuits of the circuits of Figs. 3 to 13 and will not be discussed in great detail.

Figure 14:
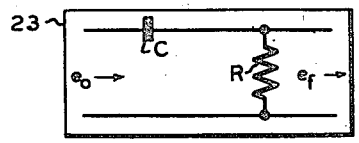
Figs. 14 to 21 show other types of translating circuits useful in the system of Fig. 2 to provide time integral outputs.

Fig. 14 shows a series-connected condenser C and resistor R energized by the feedback-input signal $e_o$. The feedback voltage derived from across resistor R produces a resultant output signal $e_o$ having components proportional to the input signal and the time integral thereof. The relative amplitudes of the control signal and integral signal components of the output may be adjusted by adjustment of the values of condenser C or resistor R. It will be seen that the circuit of Fig. 14 is essentially a differentiating circuit of a well-known type, as shown in the above mentioned Hull patents.

Figure 15:
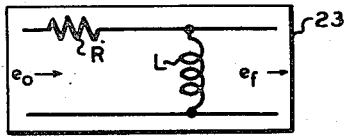

Fig. 15 shows a feedback circuit consisting of a series connected-resistor R and inductance L, the feedback voltage $e_f$ being obtained as the volt-drop across inductance L. The output voltage $e_o$ will be similar to that of Fig. 14, and may be similarly adjusted.

Figure 16:
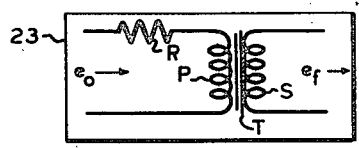

Fig. 16 shows a feedback circuit consisting of series-connected resistor R and primary winding P of a transformer T having mutual inductance M, the feedback voltage being derived from the secondary winding S of transformer T. Here again, the output voltage $e_o$ will be of the same character as with Figs. 14 and 15. For high values of resistor R relative to mutual inductance M, a substantial pure integral output will be obtained.

Figure 17:
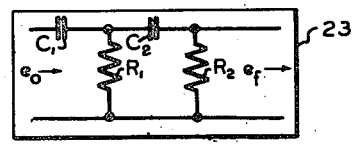

Fig. 17 shows a feedback circuit which is essentially the cascaded connection of two circuits of the type of Fig. 14, and as a result produces an output voltage $e_o$ having components corresponding to single and double time integrals of the input voltage, which are also relatively adjustable in magnitude by adjusting the various circuit constants.

Figure 18:
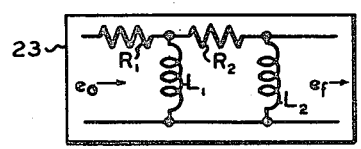

Fig. 18 represents a feedback circuit having the cascaded connection of two circuits of the type of Fig. 15, and the output voltage $e_o$ will be of the same type as in Fig. 17.

Figure 19:
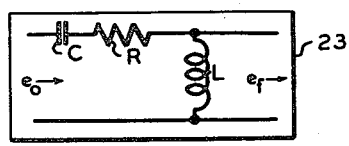

Fig. 19 shows a feedback circuit comprising series-connected condenser C, resistor R and inductance L, the feedback voltage $e_f$ being derived from the volt-drop across inductance L. The resultant output voltage $e_o$ using this circuit will have components representing the control signal $e_i$ and the single and double time integrals thereof.

Figure 20:
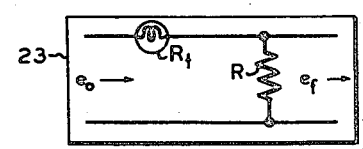

Fig. 20 shows a circuit which is essentially the inverse of that of Fig. 11. In this instance, a sudden change of input voltage $e_i$ will produce a corresponding change of output voltage $e_o$ which at the first instant will produce a large feedback voltage $e_f$ causing only a small output voltage $e_o$. As resistor $R_t$ gradually heats up and increases its resistance the feedback voltage slowly decreases, permitting the gradually increasing of output voltage $e_o$ corresponding roughly to a time integral of the input signal $e_i$.

Figure 21:
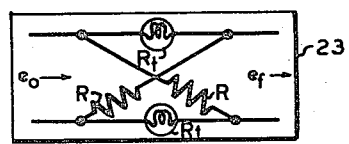

The circuit of Fig. 21 is essentially the inverse of the circuit of Fig. 12. In this instance, the bridge circuit is adjusted to be balanced when the thermal resistors $R_t$ are in their heated or high resistance condition. Accordingly, when a signal is first impressed upon this circuit the bridge will be widely unbalanced, producing a large feedback voltage and a consequent low output voltage $e_o$. As the input voltage is maintained, the resistors $R_t$ gradually heat up and slowly bring the bridge circuit back toward a balanced condition, reducing the feedback voltage correspondingly. This gradually increases the output voltage $e_o$ in a corresponding sense, producing an output voltage which roughly represents a time integral of the input voltage.

It is to be noted that the circuit of Figs. 20 and 21 will also operate with modulated alternating signals in which the control signal $e_i$ is effectively a modulation upon a carrier of frequency $f$, the input to the circuit being of the form $e_i \sin 2\pi ft$. In this case, as in Figs. 11 and 12, variations at the carrier frequency $f$ are ineffective, due to the thermal lag of the resistors $R_t$, and accordingly the output voltage will have a modulation envelope $e_f$ which corresponds directly to and to a time integral of the modulation envelope $e_i$ of the input voltage.

Figure 22:
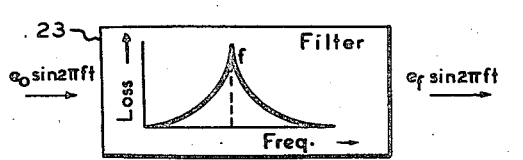
Figs. 22 to 25 show modifications of the circuit of Fig. 2.

Fig. 22 represents the inverse of Fig. 13. Here a filter circuit is used as the feedback circuit having high loss at the carrier frequency $f$. This filter is in effect, therefore, a single-frequency-elimination filter, of which many types are well known in the art. For a sudden large change in input voltage sidebands widely separated in frequency from the carrier frequency $f$ will be produced, which will be only slightly attenuated by the filter circuit to produce a large feedback voltage, holding the output voltage to an initial low value. As the change in signal decreases and ceases, these sidebands approach the carrier frequency, producing smaller feedback voltage and larger output voltage, so that the modulation envelope of the output $e_o \times \sin 2\pi ft$ corresponds to the time integral of the modulation envelope of the input $e_i \times \sin 2\pi ft$, the carrier frequency $f$ being the same for both.

It is to be noted from Equation 3 that the output signal $e_o$ depends only upon the input signal $e_i$ and the instantaneous gain $\beta$ of the translating circuit 23 of any of the types shown in Figs. 3–22. As has just been seen, this instantaneous gain may be of such character as to provide an integral functional relationship, a derivative relationship or any other desired relationship, between the input and output voltages $e_o$ and $e_f$ of the translating circuit 23. The voltage $e_o$ does not depend in any way upon the gain $\mu$ of amplifier 22. Since $\mu$ is generally very small and less than 1, being normally of the order of 0.1 to 0.001 in value, it will be seen that the present circuit derives an output derivative or integral of amplified magnitude which is substantially independent of the amplifying characteristics of amplifier 22, depending only upon the characteristics of translating circuit 23, the over-all gain being $$\frac{1}{\beta}$$

which is the attenuation of circuit 23. This translating circuit 23 will normally contain only passive circuit elements, such as resistances, condensers and inductances, which can easily be made quite stable and will therefore have little or no fluctuation in characteristics, so that the signal-modifying circuit of Fig. 2 will have greatly improved operating characteristics over that described with respect to Fig. 1.

It is to be understood that the device of Fig. 2 may be used to obtain any desired type of functional relationship between an output voltage $e_o$ and an input voltage $e_i$, merely by using a translating circuit 23 having an inverse functional relationship between its input and output voltages, and that thereby the overall characteristics of the circuit will be substantially independent of the amplifier 22 and dependent only upon the characteristics of the translating circuit 23. Combined derivative and control signal output may be obtained by using the feedback circuits of Figs. 3–12. Combined integral and control signal output may be obtained by using the feedback circuits of Figs. 14–21. Any other desired relationship may be obtained by using a proper feedback circuit determined by the considerations discussed above.

It is to be understood that amplifier 22 need not be a purely electronic or electrical amplifier, but may include any device producing a high ratio $\mu$ of output to input, where the output is capable of being or may be converted into a form capable of being transformed into a feedback signal similar in character to $e_i$ and bearing a relationship to its input (corresponding to the output signal $e_o$) inverse to that desired for the overall system.

Figure 23:
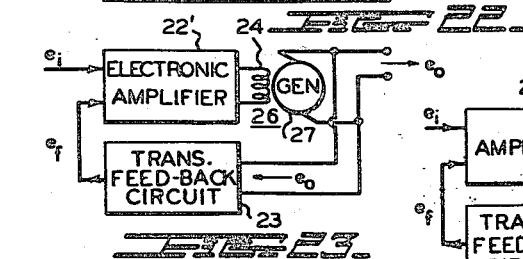

One such circuit is shown in Fig. 23 where the input signal $e_i$ is fed to an electronic amplifier 22' whose output energizes the field winding of a suitably driven generator 26. The output voltage of the armature 27 of generator 26 may then be used to control the servo 21 of Fig. 1, and is also used to provide the voltage $e_o$ which is fed back through translating circuit 23' to produce the feed-back voltage $e_f$ to be combined with the input voltage $e_i$.

Figure 24:
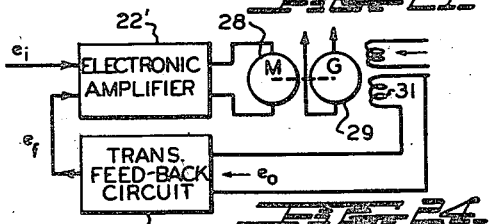

Another type of system is shown in Fig. 24 wherein the output of amplifier 22' correspondingly actuates a variable speed motor 28 driving a generator 29 whose output may be used to control servo 21. A pick-up coil 31 may be associated with generator 29 to produce a voltage corresponding to the output of generator 29, and this voltage may then be used as the input $e_o$ to translating circuit 23' to provide the feed-back voltage $e_f$.

Figure 25:
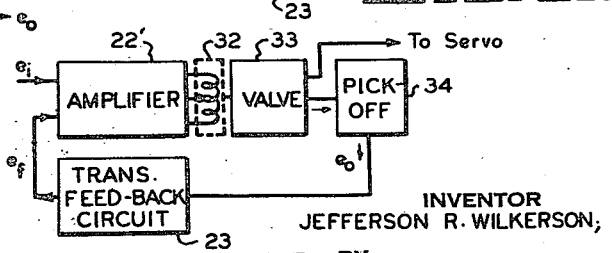

The amplifying device 22 need not even be wholly electrical in character. Thus, as shown in Fig. 25, the output of amplifier 22' may actuate a suitable torque motor 32 which controls a hydraulic valve 33 for producing a differential hydraulic pressure corresponding to the voltage input to amplifier 22'. This differential pressure may then be used to control servo 21, which would then be of the hydraulic type. In order to provide the feed-back signal, a pressure pick-off 34 may be used to generate a signal corresponding to the differential pressure applied to the servo 21 and this signal is then fed to the translating circuit 23' to provide feedback voltage for amplifier 22'.

Many other types of system, including electrical, mechanical, hydraulic, pneumatic, thermal, etc., amplifying and servo-controlling devices may be used for amplifier 22 of Fig. 4. As shown above, the overall characteristics of the improved rate circuit of the present invention depend only upon the characteristics of the translating circuit 23, so long as the gain $\mu$ of the amplifier 22 is much greater than the attenuation $$\frac{1}{\beta}$$

of the translating circuit 23.

Fig. 26 shows a complete control circuit, such as for the system of Fig. 1, which incorporates and combines both a phase-sensitive amplifier and a rate circuit of the type discussed with respect to Fig. 2. Here the input signal, which is of the variable-amplitude reversible-phase alternating type, such as derived from the pick-off 13 of Fig. 1, is connected to the primary of an input transformer 36 having two independent secondary windings 37 and 38. In order to produce a reversible-polarity output, the circuit of Fig. 26 is made of the push-pull type, balanced with respect to ground, so that the potentials of each similar half of the circuit vary oppositely. Thus, the voltages produced by secondary windings 37, 38 are connected in opposite sense to the respective input grids 39 and 40 of respective control tubes 41 and 42, which are shown as being of the pentode type, although it will be understood that any other type of amplifying electron discharge tube may be used. These input voltages to tubes 41 and 42 are connected in series with respective oppositely-varying feedback voltages produced, as will be described, across condensers 43 and 44.

Impressed between ground and the interconnected cathodes 46 and 47 of the respective tubes 41 and 42 is a source of alternating current 48 having the same frequency as the frequency of the input signal and having fixed phase with respect thereto. Preferably this phase relationship is so chosen that the voltage of source 48 is always either in phase coincidence or in phase opposition with the input signal voltage, depending upon the phase-sense of this input.

The anodes 51 and 52 of tubes 41 and 42 are connected to ground 49 through respective output resistors 53, 54, and hence are energized by source 48. The screen grids 56, 57 are connected together and to ground through a voltage-dropping resistor 58.

Neglecting for the moment the effect of the feedback voltages across condensers 43, 44, tubes 41, 42 are selected and adjusted to produce equal voltages across resistors 53, 54, for zero input signal voltage to transformer 36. These voltages across resistors 53, 54 will be uni-directional pulsating voltages produced by the half-wave rectification of the voltage of source 48 in tubes 41, 42.

Accordingly, the net voltage across anodes 51, 52 will be zero under these conditions.

When a signal of predetermined phase is impressed on input transformer 36, one of the control grids 39 or 40, for example, grid 39 will become more positive at the same instant that its corresponding anode 51 becomes positive, whereas the other grid 40 will become more negative as its corresponding anode 52 becomes positive, by virtue of the opposite connection of the secondaries 37, 38 to these respective grids 39, 40. It will be clear that the particular grid 39 or 40 which thus becomes more positive will depend upon the particular phase-sense of the input control signal, which may reverse, depending on the control action required.

Assuming that grid 39 is thus rendered more positive, more anode current will flow to anode 51 during negative half cycles of source 48 (when anodes 51, 52 are positive with respect to their cathodes 46, 47) and therefore a greater voltage will be impressed across its corresponding output resistor 53. At the same time, the other tube 42 whose control grid 40 becomes more negative will have reduced anode current, and accordingly a reduced volt-drop will be produced across its corresponding output resistor 54. The net voltage across the series-connected resistors 53, 54 (that is, the voltage across anodes 51, 52) will then be a half-wave rectified pulsating voltage having a magnitude corresponding to the amplitude of the alternating input control signal and having a polarity corresponding to the phase of this input signal.

It will be seen therefore that tubes 41, 42 comprise essentially a phase-sensitive amplifier or detector such as indicated schematically at 17 in Fig. 1. At the same time, however, tubes 41, 42 are adapted to be used as the amplifier 22 of Fig. 2. Thus, the output voltage derived across anodes 51, 52 is applied to a translating circuit 23 to produce corresponding oppositely varying feedback voltages across condensers 43, 44, which are inserted in series with respective secondary windings 37, 38 of transformer 36 to control the input grids 39, 40 of tubes 41, 42 in the manner discussed with respect to Fig. 2 and the subsequent figures.

Feedback circuit 23, in this instance, comprises a pair of resistors 61, 62 connected to respective anodes 51, 52 and joined in series with a condenser 63 and a further resistor 64. Because of the balanced circuit arrangement, condenser 63 and resistor 64 are essentially equivalent to (that is, will have the same effect as) the circuit shown in dotted lines, comprising a resistor 66 in series with a condenser 67, and a resistor 68 in series with a condenser 69, the junction point of condensers 67 and 69 being at the same potential as the junction point 45 of condensers 43, 44 (that is, half-way between the potentials of anodes 51, 52) so that it may be joined thereto as indicated, if desired. If each of the resistors 66, 68 has a resistance half that of resistor 64 and if each of the condensers 67, 69 has a capacitance twice that of condenser 63, the circuit 66, 67, 68, 69 will be the exact equivalent to that of 63, 64 and will be substantially identical to two circuits of the type shown in Fig. 3 placed in push-pull relation, with the further modification that the output voltage instead of being derived across the capacitance of the circuit as in Fig. 3, is derived across the capacitance and a portion of the resistance.

As discussed with respect to Fig. 3, that circuit will produce an output voltage having components corresponding to the input control signal and its time integral. The effect of series resistors, such as 66 and 68, is to increase the relative magnitude of the control signal component and to generally extend the range of rates of change of the input signal which can be effectively handled by the system.

The output voltage derived across condenser 63 and resistor 64 (which is twice the hypothetical voltage across resistor 66 and condenser 67, for example) is then impressed upon a second push-pull integrating circuit, such as of the type shown in Fig. 5, which thereupon produces across condensers 43 and 44 oppositely varying output voltages corresponding to the voltage across condenser 63 and resistor 64 and first and second time integrals thereof. Accordingly, this net output voltage has components corresponding to the difference between the anode voltage of tubes 41 and 42 and to time integrals thereof. These output voltages, which are varying unidirectional voltages, are added to the alternating control signal voltages produced in secondaries 37, 38 to control tubes 41, 42.

In essence, the negative biases on tubes 41, 42 are controlled in opposite senses by the feedback circuit 23. As described relative to Fig. 2, this will produce a unidirectional differential voltage having control signal, rate signal and second derivative signal components, across resistors 53, 54, so long as the gain of tubes 41, 42 is large compared to the attenuation of circuit 23. This voltage is then differentially impressed upon the inputs to respective push-pull connected modulator tubes 71, 72 having an alternating voltage derived from source 48' impressed upon the anodes 73, 74 thereof through respective halves of the primary winding of output transformer 83, and also upon the screen grids 76 and 77 through a voltage-dropping resistor 78. Source 48' is shown as independent from source 48, but is preferably identical therewith, or at any rate produces a voltage of a phase and frequency identical with that of source 48. A suitable cathode biasing resistor 79 is connected between the cathodes 81, 82 and ground 49.

In the absence of input signal to transformer 36, as stated above, equal half-wave rectified voltages will be produced across resistors 53, 54. When a definite control signal is impressed upon the input to transformer 36, for example, such as to render grid 39 more positive and grid 40 more negative during negative half cycles of source 48, the voltage across resistor 53 will increase and that across resistor 54 will decrease, as discussed above, in accordance with the magnitude and the derivatives of the magnitude of the input voltage. These voltages are also unidirectional half-wave rectified voltages, since tubes 41, 42 will be conductive only during the half-cycles of source 48 when negative voltage is impressed on cathodes 46, 47. Being unidirectional, they must be directly applied to grids 70, 75 to control tubes 71, 72 in the desired manner. Because of this direct connection, the cathodes 81, 82 are directly connected to ground at 49, through biasing resistor 79, so that anodes 73, 74, energized from source 48' must have instantaneously opposite polarity from that of anodes 51, 52 if sources 48 and 48' are to be the same, as is preferable. Tubes 71, 72 can conduct only when positive voltage is applied to anodes 73, 74. At this time positive voltage is applied to cathodes 46, 47 (which is the same as negative voltage applied to anodes 51, 52) so that tubes 41, 42 are blocked and zero voltage would appear across resistors 53, 54. Hence tubes 71, 72 would be ineffective and no output could be obtained, since tubes 71, 72 could operate only at times when they would have zero input.

To avoid this, condenser 59 is connected across anodes 51, 52 and hence across resistors 53 and 54 in series. Condenser 59 serves two functions simultaneously. Firstly, it "carries over" the output voltages of tubes 41, 42 from the positive half-cycle (when anodes 51, 52 are positive relative to cathodes 46, 47) to the succeeding half-cycle, by being charged during the positive half cycles and remaining substantially charged during the succeeding half cycles, so that the proper input voltages are applied to tubes 71, 72 during the periods in which these tubes are effective.

Condenser 59 serves the additional function of eliminating the high bias caused by the standby or quiescent voltage across resistors 53, 54 by "carrying over" only the difference between the volt-drops across resistors 53, 54. Thus, during the conducting half cycles of tubes 41, 42, considerable current is drawn through resistors 53, 54, rendering grids 70, 75 markedly negative, perhaps beyond cut-off. If these voltages were carried over, as by condensers individually shunted across resistors 53, 54, excessive bias would remain on grids 70, 75 and would seriously impair the operation of tubes 71, 72. However, condenser 59, being connected across anodes 51, 52, is charged up by the difference in these voltages. During the succeeding half-cycles of opposite polarity, tubes 41, 42 are blocked by the negative voltages applied to their anodes 51, 52 and condenser 59 discharges slowly through resistors 53, 54 in series. These resistors 53, 54 thereby serve as voltage dividers and impress only half the voltage of condenser 59 (which is the desired output voltage) on each of grids 70, 75, thus eliminating the excessive biases discussed above.

Accordingly, anode currents will be produced by tubes 71, 72 whose difference will correspond to the difference between the volt-drops across resistors 53, 54 and hence to the magnitude and time derivatives of the control signal input to transformers 36. These currents are again half-wave-rectified pulsating currents, since tubes 71, 72 conduct only half the time. These currents are then fed differentially into the respective halves of the primary of center-tapped output transformer 83. A condenser 84 may be connected across the primary of transformer 83 to produce a "fly-wheel" circuit for supplying the missing half-cycles of the output voltage. The condenser 84 preferably tunes transformer 83 to the frequency of source 48'. The output voltage derived from transformer 83 can then be used to suitably control any type of servo 21 (Fig. 1), which may be a two-phase motor having one of its two-phase windings fixedly energized from a source in phase quadrature with source 48 and the other winding controlled from the output of transformer 83, or may comprise any other type of servo, such as one which may be controlled from a torque motor 86, comprising two opposed coils 87, 88 fed from respective halves of the secondary or transformer 83 through source 89 in phase therewith, whereby the output from the rate circuit increases the strength of current in one of coils 87, 88 while decreasing that of the other.

In this manner, there is provided a compact, efficient and simple control circuit for controlling a ponderable object in response to a relatively weak control signal, or, generally, for producing an alternating voltage whose magnitude has components corresponding to the magnitude of an alternating control signal and to time derivatives thereof. Such circuits are very useful in servo systems and automatic pilots. By proper choice of values of the circuit components of feedback circuit 23, any desired relative magnitudes of the control signal, rate signal and other derivative components of the currents controlling servo 21 may be adjusted to the proper value for substantially eliminating all hunting and lag.

Fig. 27 shows a modification of the circuit of Fig. 26. Here the input control signal is supplied to input transformer 36 as before, and the voltages obtained in secondary windings 37, 38 are led to the control grids 39' and 40' of phase-sensitive amplifier or detector tubes 41' and 42' by way of series-connected grid resistors 91 and 92, and in series with the feedback voltages produced across condensers 43' and 44' in the manner to be described. Cathodes 46' and 47' of tubes 41' and 42' are connected together and to ground at 49. Anodes 51', 52' of these tubes are connected through respective output resistors 53, 54 to source 48 of alternating current. The action of tubes 41', 42' is exactly similar to that of tubes 41, 42 of Fig. 26 and supplies differentially-varying half-wave-rectified unidirectional voltages to the control grids 93, 94 of the succeeding A. C. energized D. C. amplifier tubes 96, 97, the difference in these voltages corresponding in polarity and magnitude to the phase-sense and magnitude of the signal input to transformer 36 (neglecting for the moment the effect of feedback circuit 23').

Condenser 59' is connected between anodes 51' and 52' and serves the same function as condenser 59 of Fig. 26. Cathodes 98 and 99 of tubes 96, 97 are connected together and through a common cathode biasing resistor 100 to the junction of resistors 53 and 54 and to source 48. The screen grids 101 and 102 of tubes 96, 97 are connected together through a voltage-dropping resistor 103 to ground at 49. The suppressor grids of tubes 96, 97 are connected to their cathodes in the conventional manner. The anodes 106, 107 of tubes 96, 97 are connected through respective output resistors 108, 109 to ground at 49. Condenser 104 is connected across anodes 106, 107 and serves the same function as condensers 59' and 59. In this manner, tubes 41', 42' and 96, 97 form a two-stage alternating-current-energized phase-sensitive detector and amplifier.

The resultant voltage appearing across condenser 104 is then connected to the input of feedback circuit 23', which is similar in function to circuit 23 of Fig. 2 and Fig. 26, and serves to produce across its output condensers 43' and 44' oppositely varying voltages corresponding to the magnitude and time integrals of the output voltage across condenser 104. These voltages are inserted in series with the respective inputs to tubes 41', 42' and effectively serve to control the bias of tubes 41', 42' to thereby control the amplification of the alternating signals fed to these tubes by way of transformer windings 37, 38.

Feedback circuit 23' is generally similar to circuit 23 of Fig. 26, with certain modifications for improving the operation thereof. Here also a balanced push-pull type circuit is used for producing equal and oppositely varying output voltages across condensers 43', 44' for introduction into the input circuits of tubes 41' and 42' in opposite senses.

The feedback circuit 23' may best be explained by considering only one half of this circuit (which is duplicated in opposite sense for the other half) and by first assuming that resistors 117 and 118 have zero resistance. Under these circumstances, resistor 111, condenser 116, resistor 119 and condenser 121 form a translating circuit of the same type as that shown in Fig. 7. Resistors 111 and 119 are chosen to have high resistance values, so that the output of the translating circuit 23' will be a substantially pure double integral, which produces a resultant output voltage $e_0$ from the entire circuit which will be a substantially pure second derivative of the input signal $e_1$, which in this instance is the magnitude of the input voltage to input transformer 36. Resistor 119 may be made adjustable to adjust the magnitude of the second derivative component thus obtained.

The insertion of a slight amount of adjustable resistance 117 in series with condenser 116 will cause the voltage across the series connection of resistor 117 and condenser 116 to have components corresponding to the input voltage to the feedback circuit directly, and to the time integral of this input voltage. This combined voltage is then integrated by the second integrating circuit 119—121, and will therefore produce a combination of the single and double integrals in the feedback circuit output. Since resistance 111 is very large, the current in the feedback circuit will be substantially proportional to the input voltage to the feedback circuit, and accordingly by adding a small amount of resistance at 118, the volt-drop thereacross will be proportional to the feedback circuit input signal. Hence, the resultant output voltage across the series connection of resistor 118 and condenser 121 will have components directly corresponding to the input to the feedback circuit and to the first and second time integrals thereof, and will therefore be of the character required to produce control signal, rate signal and time derivative signal components in the resultant output voltage appearing across condenser 104, in the manner already described.

Variable resistance 113 taken in cooperation with fixed resistors 111 and 112 forms a voltage divider across condenser 104, and thereby provides means for controlling the magnitude of the input to the feedback circuit 23'.

The remaining half of the feedback circuit 23' is exactly similar to that just described but connected in reverse sense, so that the voltage appearing across condenser 44' will be exactly of similar wave form to that across condenser 43' but of opposite polarity and thereby serve to control tube 42' in a sense opposite to that of 41' to yield the required differential output from the complete circuit.

Condensers 43' and 44' provide respective low impedance connections between the windings 37, 38 and ground at 49, in order to prevent the building up of substantial voltage of the frequency of source 48 on the control grids of tubes 41', 42' by virtue of the capacitive coupling between the anodes and these control grids. These condensers 43' and 44' will have little effect upon the feedback circuit, since they are chosen to have very small capacitance in comparison to condensers 116 and 121, and therefore have high reactance at the normal rates of change of the control voltage.

It will be noted that the voltage input to feedback circuit 23' is derived after two stages of amplification, first by tubes 41', 42' and then by 96, 97. The resulting voltage may produce too large an output from circuit 23', thereby providing excessive bias for grids 39', 40'. To overcome this effect, a further bias is supplied from source 48 by way of rectifier 131. Thus, connected across resistor 113 is a potentiometer 132, whose variable arm 133 is connected to rectifier 131. Rectifier 131 will be seen to have two load circuits, the first comprising the upper part of potentiometer 132, resistor 111, and resistor 109 to ground, and the other comprising the lower part of potentiometer 132, resistor 112 and resistor 108 to ground. Each of these load circuits is bypassed to ground for alternating currents by a condenser 134.

The unidirectional voltage drops thus produced across the respective parts of potentiometer 132 are further filtered by condensers 43', 44' and are thereby applied to the control grids 39', 40' to supply the proper net bias thereto.

In this manner, in accordance with the theory discussed with respect to Fig. 2, the voltage produced across condenser 104 contains components proportional to the input control signal and to time derivatives of the various orders thereof. This combined signal is fed to a further amplifier circuit comprising tubes 136, 137 which have their anodes 138, 139 energized by A. C. by being connected to source 48' through the torque motor coils 87, 88, the cathodes of tubes 136, 137 being connected together and to ground through the common biasing resistor 141. Each of the windings 87, 88 is bypassed by respective bypass condensers 151, 152, whereby substantially only direct current passes through these windings.

For zero voltage input to transformer 36, the currents passing through coils 87, 88 will be equal and will have opposite effect on the output of torque motor 86. When a fixed or varying signal is impressed on transformer 36, the currents passing through windings 87, 88 will vary equally and oppositely in accordance with this input signal and its time derivatives, whereby the output of torque motor 86 may be utilized, with the proper proportioning of these signal components, to suitably control a servo such as 21 of Fig. 1 for actuating a ponderable object without hunting or lag as is desired.

Fig. 28 shows a further modification of the circuits of Figs. 26 and 27 employing a phase-sensitive detector stage 41, 42 similar to that of Fig. 26 and a single amplifier stage 96, 97 similar to that of Fig. 27. The feedback circuit is similar to circuit 23' of Fig. 27, but is connected in this instance across the torque motor 87, 88 which forms the output of tubes 96, 97. The rate circuit action of this modification is believed to be clear from the preceding explanation.

In this instance, rectifier 131 is omitted, and the proper bias obtained by utilizing the grid rectifying properties of tubes 41, 42. For this purpose, the cathodes of tubes 41, 42 are connected to A. C. source 48" of the same phase as source 48 but of lesser amplitude, thus providing proper bias. The proper balancing action is obtained by adjustment of potentiometer 140, whose variable arm is grounded. The remaining portions of Fig. 28 are similar to Figs. 26 and 27 and are believed to require no further explanation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a control system for a ponderable object having means for producing a reversible-phase, variable magnitude alternating control signal corresponding to the desired motion of said object and also having a servo system for moving said object, the combination comprising balanced two-channel electronic means for amplifying said signal and producing therefrom a reversible-polarity, variable-magnitude, unidirectional output signal, balanced circuit means responsive to said output signal for producing therefrom oppositely varying unidirectional feed-back signals respectively having components corresponding to the magnitude of said unidirectional signal and to at least one time integral thereof, the amplification of said amplifying means being much larger than the attenuation of said circuit means, means for oppositely and degeneratively controlling the amplification of said two channels by said respective feed-back signals, and means for controlling said servo system by said output signal, whereby said servo system may be controlled in accordance with said control signal and at least one time derivative thereof.

2. In a control system for a ponderable object having means for producing a reversible-phase variable-magnitude alternating control signal corresponding to the desired motion of said object, the combination comprising balanced two-channel electronic means for amplifying said signal and producing therefrom a reversible-polarity variable-magnitude unidirectional output signal, balanced circuit means responsive to said output signal for producing therefrom oppositely varying unidirectional feed-back signals respectively corresponding to at least one time integral of the magnitude of said output signal, and means for oppositely controlling the amplification of said two channels by said respective feed-back signals, whereby said output corresponds to at least one time derivative of the magnitude of said control signal.

3. In a control system for a ponderable object having means for producing a control signal corresponding to the desired motion of said object, the combination comprising means for amplifying said control signal, means for integrating the output of said amplifying means, and means for opposing said control signal by said integrated signal in the input to said amplifying means, whereby said output corresponds to the rate of change of the magnitude of said control signal.

4. In a control system for a ponderable object having means for producing a control signal corresponding to the desired motion of said object and also having a servo system for moving said object, the combination comprising means for amplifying said signal, capacitance-resistance circuit means responsive to the output of said amplifying means for producing a feed-back signal having components corresponding to said control signal and at least one time integral thereof, the gain of said amplifying means being large compared to the attenuation of said circuit means, means for degeneratively controlling said amplifier by said feed-back signal, and means for controlling said servo system by said output, whereby said servo system is controlled in accordance with said control signal and at least one time derivative thereof to produce non-hunting, non-lagging actuation of said ponderable object.

5. In a control system for a ponderable object having means for producing a control signal corresponding to the desired motion of said object and also having a servo system for moving said object, the combination comprising means for amplifying said signal, circuit means responsive to the output of said amplifying means for producing a feed-back signal having components corresponding to said control signal and to at least one time integral thereof, the amplification of said amplifying means being large compared to the attenuation of said circuit means, means for controlling the input of said amplifying means by the difference between said control signal and said feed-back signal, and means for controlling said servo system by said output, whereby said servo system is controlled in accordance with said control signal and at least one time derivative thereof.

6. In a control system for a ponderable object having means for producing a control signal corresponding to the desired motion of said object, the combination comprising means for amplifying said signal, circuit means responsive to the output of said amplifying means for producing a feed-back signal corresponding to at least one time integral of said output, and means for controlling the input of said amplifying means by said feed-back signal, whereby said output corresponds to at least one time derivative of said control signal.

7. In a control system for a ponderable object having means for producing a control signal corresponding to the desired motion of said object and also having a servo system for moving said object, the combination comprising means for amplifying said signal, circuit means for modifying the output of said amplifying means to produce a feed-back signal therefrom, the amplification of said amplifying means being large compared to the attenuation of said circuit means, means for degeneratively coupling said feed-back signal to the input of said amplifying means, and means for controlling said servo system by said output, whereby said servo system is controlled in accordance with said control signal modified in inverse manner to the modification produced by said circuit means.

8. In a control system for a ponderable object having means for producing a control signal corresponding to the desired motion of said object and also having a servo system for moving said object, the combination comprising means for amplifying said signal, circuit means for modifying the output of said amplifying means to produce a feed-back signal and for coupling said feed-back signal to the input of said amplifying means, and means for controlling said servo system by said output, whereby said servo system is controlled in accordance with said control signal modified in inverse manner to the modification produced by said circuit means.

9. In a control system responsive to a control signal, the combination comprising means for amplifying said signal, circuit means for modifying the output of said amplifying means to produce a feed-back signal therefrom having substantially the same magnitude as said control signal, and means for degeneratively coupling said feed-back signal to the input of said amplifying means, whereby said output corresponds to said control signal modified in inverse manner to the modification produced by said circuit means.

10. In a control system responsive to a control signal, the combination comprising means for amplifying said control signal, means for modifying the output of said amplifying means to produce a modified signal, the amplification of said amplifying means being much larger than the attenuation of said modifying means, and means for degeneratively controlling said amplifying means by said modified signal, whereby said output corresponds to said control signal modified in inverse manner to the modification produced by said modifying means.

11. A control system as in claim 10, wherein said modifying means comprises means for integrating said output, whereby said output corresponds to a time derivative of said control signal.

12. A control system as in claim 10, wherein said modifying means comprises means for producing a signal corresponding to said output and a time integral thereof, whereby said output corresponds to said control signal and a time derivative thereof.

13. A control system as in claim 10, wherein said modifying means comprises means for producing a feed-back signal corresponding to said output and to a first and double time integral thereof, whereby said output corresponds to said control signal and the first and second derivatives thereof.

14. A differentiating amplifier for delivering an output voltage having a component corresponding to a time derivative of an input voltage, comprising an amplifier having an input circuit and an output circuit, a feedback path from the output circuit to the input circuit, and a resistor and a capacitor serially connected across said output circuit, said capacitor also forming a part of said feedback path to provide a feedback voltage to said input circuit modified with respect to the output circuit voltage, said feedback path being connected to apply said feedback voltage in a degenerative sense to said input circuit.

15. In a control circuit responsive to an input voltage, the combination comprising an amplifier having an input circuit and an output circuit, a feedback path from said output circuit to said input circuit, resistor means and capacitance means serially connected to said output circuit, said capacitance means and a portion of said resistance means also forming a part of said feedback path to provide a feedback voltage to said input circuit which is modified with respect to said output circuit voltage, said feedback path being connected to apply said feedback voltage in a degenerative sense to said input circuit.

16. A differentiating amplifier adapted for delivering an output voltage having a component corresponding to a time derivative of an input voltage comprising an amplifier having an input circuit and an output circuit, a feedback path from said output circuit to said input circuit, resistance and capacitance means connected to said output circuit and including a parallel-connected resistor and capacitor forming a part of said feedback path to provide a feedback voltage to said input circuit having components corresponding to said output voltage and at least one time integral of said output voltage, said feedback path being connected to apply said feedback voltage in a degenerative sense to said input circuit.

17. In a control circuit responsive to an input voltage, the combination comprising an amplifier having an input circuit and an output circuit, a feedback path from said output circuit to said input circuit and including circuit means for producing a feedback voltage having a component corresponding to a time integral of the output voltage from said amplifier, said feedback path being connected to apply said feedback voltage in a degenerative sense to said input circuit, whereby said output voltage has a component representing a time derivative of said input voltage.

18. An amplifier adapted to deliver an output voltage having a component corresponding to the voltage input thereto modified with respect to time, said amplifier comprising an input circuit and an output circuit, a feedback path from the output circuit to the input circuit, and a reactance in said feedback path to provide a feedback voltage corresponding to the output voltage modified with respect to time, said feedback path being connected to apply said feedback voltage in a degenerative sense to said input circuit.

19. In a control system including means for producing a control signal and servo mechanism controlled thereby for moving an object, the combination comprising means for amplifying said signal and applying it across output taps, feedback circuit means connected across said output taps and including means for modifying the output of said amplifying means to produce a feedback signal therefrom, the amplification of said amplifying means being high compared to the attenuation of said circuit means, means for degeneratively coupling said feedback signal to the input of said amplifying means, and means for controlling said servo mechanism with the output of said amplifying means.

20. In a control circuit of the character described, an amplifier having an input and an output, the voltage output of said amplifier being connected across said output, a feedback path connected across said output and connecting with said input, said feedback path including circuit means for producing a feedback voltage having a component corresponding to a time integral of the output voltage of said amplifier, and said feedback voltage being applied in a degenerative sense to said input, whereby the output voltage includes a component corresponding to a time derivative of the input voltage.

21. In a control circuit of the character described, an amplifier having an input and an output, the voltage output of said amplifier being connected across said output, a feedback circuit connected across said output and connected to said input, and a reactance in said feedback circuit for providing a feedback voltage component corresponding to the voltage applied to said feedback circuit modified with respect to time, said feedback voltage being supplied in a degenerative sense to the input.

22. A differentiating amplifier for supplying an output voltage having a component corresponding to a time derivative of the input voltage, said amplifier having an input and an output, the voltage output of said amplifier being connected across said output, a feedback path connected across said output and connecting with the input, and resistance and capacitance means connected in series and across said output, said capacitance means being also included in said feedback path and said resistance and capacitance means being of such values as to provide a feedback voltage component corresponding to the time integral of the voltage supplied to said feedback path, said feedback voltage being supplied to said input in a degenerative sense.

23. In a control circuit of the character described, an amplifier having an input and an output, the voltage output of said amplifier being connected across said output, a feedback path connected across said output and connecting with said input, inductance and resistance means connected in series and across said output, said resistance means at least in part being included in said feedback path, said resistance and inductance values being such as to provide a feedback voltage component corresponding to the voltage applied to said feedback path modified with respect to time, and said feedback voltage being applied in a degenerative sense to the input of said amplifier.

24. In a control circuit of the character described, an amplifier having an input and an output, the voltage output of said amplifier being applied across said output, a feedback path connected across said output and connecting with said input, a first, series connected, resistance and inductance means connected across said output and a second, series connected, resistance and inductance means connected across one of said first mentioned resistance and inductance means, and one of said last mentioned resistance and inductance means supplying a feedback voltage, said resistance and inductance means being of such values as to provide a feedback voltage component corresponding to the output voltage of said amplifier modified with respect to time, and said feedback voltage being supplied to said input in a degenerative sense.

25. In a circuit of the character described, an amplifier having an input and an output, a feedback path from said output to said input, resistance and inductance means connected to said output and in part being included in said feedback path, the values of said resistance and inductance means being such as to supply a feedback voltage component corresponding to the voltage applied to said feedback path modified with respect to time, and said feedback voltage being supplied to the input in a degenerative sense.

26. In a circuit of the character described, an amplifier having an input and an output, a feedback path from said output to said input, resistance and inductance means connected in series and across said output, and a second resistance and inductance means connected in series and across said first mentioned resistance means to provide a feedback voltage component, said feedback voltage component being derived from said second mentioned resistance means and being applied in a degenerative sense to the input of said amplifier.

27. In a circuit of the character described, an amplifier having an input and an output, a feedback path from said output to said input, means including inductance, resistance and capacitance connected in series and with said output, said capacitance means being included in said feedback path, and all of said means being of such values as to supply a feedback voltage including components proportional to the voltage applied to said feedback path and to a modification thereof with respect to time, said feedback voltage being applied to the input in a degenerative sense.

28. A circuit of the character recited in claim 23, in which the resistance and inductance means are so constructed and relatively arranged in circuit as to supply a feedback voltage component approximating a time integral of the voltage supplied to said feedback path.

29. A circuit of the character recited in claim 25, in which the resistance and inductance means are so constructed and relatively arranged in circuit as to supply a feedback voltage component approximating a time integral of the voltage supplied to said feedback path.

30. A circuit of the character recited in claim 27, in which the inductance, resistance and capacitance are so constructed and relatively arranged in circuit as to supply a feedback voltage including components proportional to the voltage applied to said feedback path and to a time integral thereof.

JEFFERSON R. WILKERSON.

REFERENCES CITED

The following references are of record in the file of this patent:

UNITED STATES PATENTS

| Number | Name | Date |
|---|---|---|
| 1,998,938 | Mittag | Apr. 23, 1935 |
| 2,040,014 | Moseley | May 5, 1936 |
| 2,088,654 | Hull | Aug. 3, 1937 |
| 2,251,973 | Beale et al. | Aug. 12, 1941 |
| 2,324,797 | Norton | July 20, 1943 |
| 2,352,103 | Jones | June 20, 1944 |

Certificate of Correction

Patent No. 2,448,564. September 7, 1948.

JEFFERSON R. WILKERSON

It is hereby certified that errors appear in the printed specification of the above numbered patent requiring correction as follows:

Column 7, line 16, Equation 18, for "$-e_o+$" read $-e_o=$; column 8, lines 15 and 39, Equations 21 and 22, for "$e_o=$" read $-e_o=$;

and that the said Letters Patent should be read with these corrections therein that the same may conform to the record of the case in the Patent Office.

Signed and sealed this 26th day of April, A. D. 1949.

[SEAL]

THOMAS F. MURPHY,
*Assistant Commissioner of Patents.*